(12) United States Patent
Pandit et al.

(10) Patent No.: US 10,746,068 B2
(45) Date of Patent: Aug. 18, 2020

(54) EXHAUST ENERGY REUTILIZATION DEVICE

(71) Applicant: Cummins Emission Solutions Inc., Columbus, IN (US)

(72) Inventors: Gaurav Hemant Pandit, Columbus, IN (US); John G. Buechler, Indianapolis, IN (US); Thyago Cruz, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 677 days.

(21) Appl. No.: 15/402,987

(22) Filed: Jan. 10, 2017

(65) Prior Publication Data
US 2018/0195427 A1    Jul. 12, 2018

(51) Int. Cl.
*F01N 5/04* (2006.01)
*F01N 3/20* (2006.01)
*F01N 3/08* (2006.01)

(52) U.S. Cl.
CPC ......... *F01N 3/2013* (2013.01); *F01N 3/0892* (2013.01); *F01N 5/04* (2013.01); *F01N 2240/05* (2013.01); *Y02T 10/16* (2013.01); *Y02T 10/26* (2013.01)

(58) Field of Classification Search
CPC .. F01N 2240/05; F01N 3/0892; F01N 3/2013; F01N 5/04; Y02T 10/16; Y02T 10/26
See application file for complete search history.

(56) References Cited

U.S. PATENT DOCUMENTS 7,071,585 B2    7/2006    Iida et al.

FOREIGN PATENT DOCUMENTS

DE    202014009144    *    2/2015

* cited by examiner

*Primary Examiner* — Hung Q Nguyen
*Assistant Examiner* — Diem T Tran
(74) *Attorney, Agent, or Firm* — Foley & Lardner LLP

(57) ABSTRACT

A system for reutilizing exhaust energy including a decomposition reactor, a turbine including a magnet, the turbine in fluid communication with the decomposition reactor, a coil disposed proximate to the decomposition reactor, the coil electrically coupled to the magnet, and a controller communicatively coupled to the turbine, the controller structured to determine exhaust energy output of a turbine associated with an exhaust system, and cause generation of a magnetic field based on the exhaust energy output, wherein the magnetic field causes a portion of the decomposition reactor to heat.

4 Claims, 4 Drawing Sheets

EXHAUST ENERGY REUTILIZATION DEVICE

TECHNICAL FIELD

The present disclosure relates generally to exhaust devices and systems for use with internal combustion engines.

BACKGROUND

Air entering an internal combustion may be compressed, before fuel is injected, by a turbocharger or wastegate included in the exhaust system. The turbocharger or wastegate compress air flowing into the engine cylinder. When exhaust gas containing NOx exits the turbocharger, the exhaust gas flows into the aftertreatment system of the exhaust system which is used to treat the exhaust gas. Conventional aftertreatment systems include any of several different components to reduce the levels of harmful exhaust emissions present in exhaust gas. The exhaust gas is received by and exits the diesel particulate filter to enter the decomposition reactor. While in the decomposition reactor, reductant such as diesel exhaust fluid (DEF) is applied to the exhaust gas containing NOx during a process known as hydrolysis. Certain exhaust systems for diesel-powered internal combustion engines include a selective catalytic reduction (SCR) system to convert NOx (NO and $NO_2$ in some fraction) into harmless nitrogen gas ($N_2$) and water vapor ($H_2O$) in the presence of ammonia ($NH_3$). The exhaust gas that flows through the exhaust system has considerable energy (e.g., heat energy) available downstream of the turbocharger or wastegate. Accordingly, a need exists for reutilizing exhaust energy to avoid formation of cold spots during reductant insertion or injection and to minimize reductant deposits.

SUMMARY

A first set of embodiments related to a system for reutilizing exhaust energy comprising a decomposition reactor, a turbine, a coil, and a controller. The turbine comprises a magnet. The turbine is in fluid communication with the decomposition reactor. The coil is disposed proximate the decomposition reactor. The coil is electrically coupled to the magnet. The controller is communicatively coupled to the turbine. The controller is structured to determine exhaust energy output of the turbine associated with an exhaust system, and cause generation of a magnetic field based on the exhaust energy output. The magnetic field causes the at least a portion of the decomposition reactor to heat.

A second set of embodiments relate to method for reutilizing exhaust energy. An exhaust energy output of a turbine associated with an exhaust system is determined. A magnetic field is generated based on the exhaust energy output. At least a portion of a decomposition reactor is caused to heat responsive to the generation of the magnetic field.

A third set of embodiments relate to a an apparatus comprising an energy management circuit. The energy management circuit is structured to determine exhaust energy output of a turbine associated with an aftertreatment component (such as a decomposition reactor) and, to cause generation of a magnetic field based on the exhaust energy output, wherein the magnetic field causes at least a portion of the aftertreatment component to heat.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
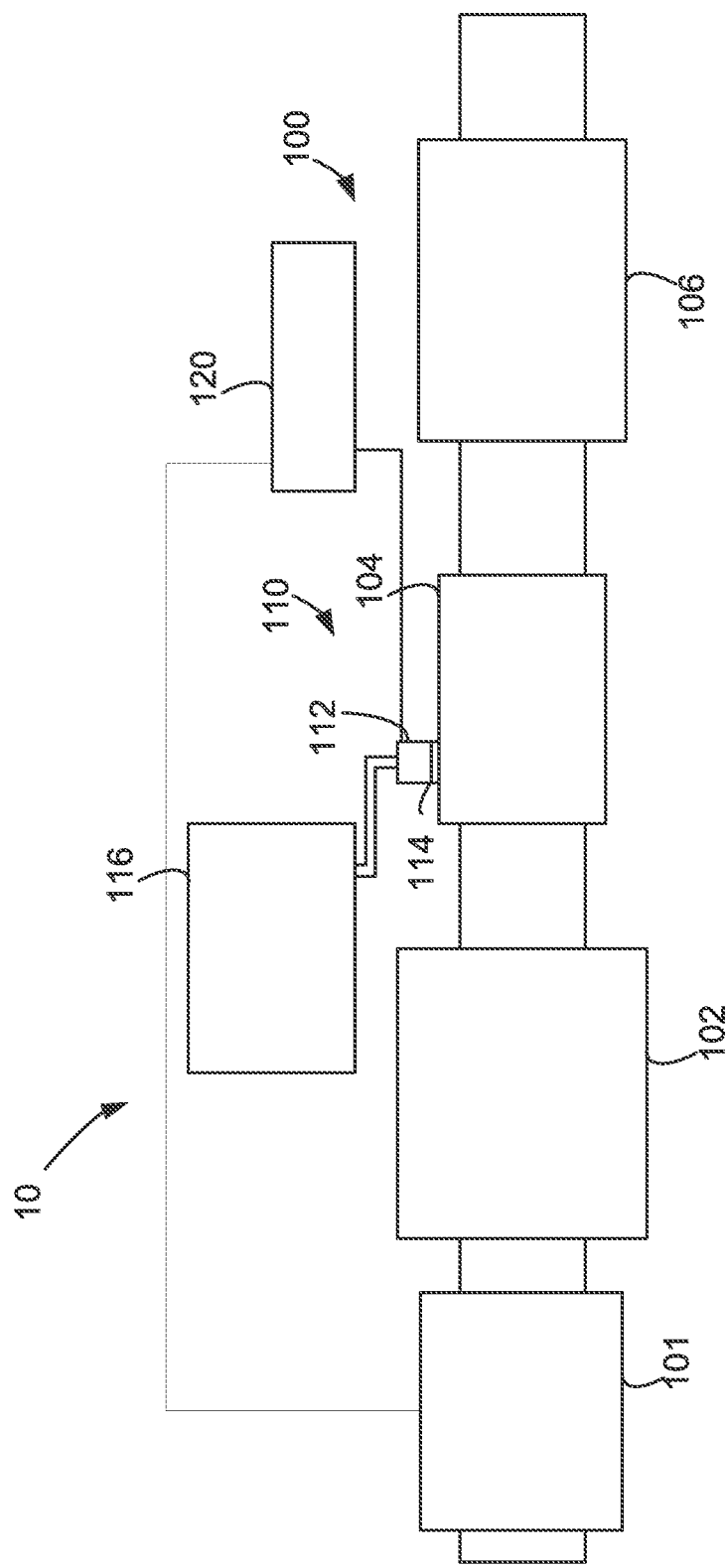
FIG. 1 is a schematic illustration of an aftertreatment system, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Referring to the Figures generally, the various embodiments disclosed herein relate generally to a system and method for reutilizing exhaust energy. According to the present disclosure, the system includes a decomposition reactor and a turbine including a magnet. The turbine is in fluid communication with the decomposition reactor. The system further includes a coil disposed proximate the decomposition reactor. The coil is electrically coupled to the magnet. The system further includes a controller communicatively coupled to the turbine. The controller is structured to determine exhaust energy output of the turbine associated with an exhaust system, and cause generation of a magnetic field based on the exhaust energy output, wherein the magnetic field causes at least a portion of the decomposition reactor to heat.

Although some example embodiments are directed to causing at least a portion of the decomposition reactor to heat, the application is not limited to such embodiments. The controller may be structured to cause generation of a magnetic field such that various components, or any part of the exhaust system, upstream or downstream of the turbocharger are heated. Parts of the exhaust aftertreatment system that may become heated include, but are not limited to, the decomposition reactor, particulate filter, reductant delivery system, SCR system, diesel oxidation catalyst (DOC), etc.

Various embodiments of the systems and methods described herein for reutilizing exhaust energy in an aftertreatment system may provide benefits that include, for example (1) minimizing or otherwise reducing reductant deposits; and (2) avoiding formation of cold spots during reductant insertion or injection.

FIG. 1 depicts an exhaust aftertreatment system 10 having an example decomposition reactor 104. The exhaust aftertreatment system 10 includes a turbocharger 101, a particulate filter, for example a diesel particulate filter (DPF) 102, a reductant delivery system 110, the decomposition reactor 104, and a SCR catalyst 106.

The turbocharger 101 is structured to compress (e.g., compress oxygen molecules together) air flowing into one or more cylinders of the internal combustion engine. The increase in air achieved during compression increases the fuel that may be utilized for an engine similar in size and increases mechanical power and efficiency during combustion. When exhaust gas containing NOx exits the turbocharger, the exhaust gas flows downstream in the aftertreatment system.

The DPF 102 is configured to remove particulate matter, such as soot, from exhaust gas flowing in the exhaust aftertreatment system 10. The DPF 102 includes an inlet, where the exhaust gas is received, and an outlet, where the exhaust gas exits after having particulate matter substantially filtered from the exhaust gas and/or converting the particulate matter into carbon dioxide.

The decomposition reactor 104 is configured to convert a reductant, such as urea, aqueous ammonia, or DEF, into ammonia. The decomposition reactor 104 includes a reductant delivery system 110 having a doser 112 configured to dose the reductant into the decomposition reactor 104. In some implementations, the urea, aqueous ammonia, or DEF is injected upstream of the SCR catalyst 106. The reductant droplets then undergo the processes of evaporation, thermolysis, and hydrolysis to form gaseous ammonia within the exhaust aftertreatment system 10. The decomposition reactor 104 includes an inlet in fluid communication with the DPF 102 to receive the exhaust gas containing NOx emissions and an outlet for the exhaust gas, NOx emissions, ammonia, and/or remaining reductant to flow to the SCR catalyst 106.

The decomposition reactor 104 includes the doser 112 mounted to the decomposition reactor 104 such that the doser 112 may dose a reductant, such as urea, aqueous ammonia, or DEF, into the exhaust gases flowing in the exhaust aftertreatment system 10. The doser 112 may include an insulator 114 interposed between a portion of the doser 112 and at least a portion of the decomposition reactor 104 to which the doser 112 is mounted. The doser 112 is fluidly coupled to one or more reductant sources 116. In some implementations, a pump (not shown) may be used to pressurize the reductant source 116 for delivery to the doser 112.

The SCR catalyst 106 is configured to assist in the reduction of NOx emissions by accelerating a NOx reduction process between the ammonia and the NOx of the exhaust gas into diatomic nitrogen, water, and/or carbon dioxide. The SCR catalyst 106 includes an inlet in fluid communication with the decomposition reactor 104 from which exhaust gas and reductant is received and an outlet in fluid communication with an end of the exhaust aftertreatment system 10.

The exhaust aftertreatment system 10 may further include an oxidation catalyst, namely a DOC, in fluid communication with the exhaust aftertreatment system 10 (e.g., downstream of the SCR catalyst 106 or upstream of the DPF 102) to oxidize hydrocarbons and carbon monoxide in the exhaust gas.

Although not shown in FIG. 1, the exhaust aftertreatment system 10 can include sensors such as, for example, temperature sensors, pressure sensors, NOx sensors, oxygen sensors, ammonia sensors and/or any other sensors. The controller 120 may be communicatively coupled to one or more such sensors to receive and interpret signals, information, or data from one or more of these sensors. The controller 120 may use the information from one or more of these sensors to carry out the functions as described herein.

Figure 2:
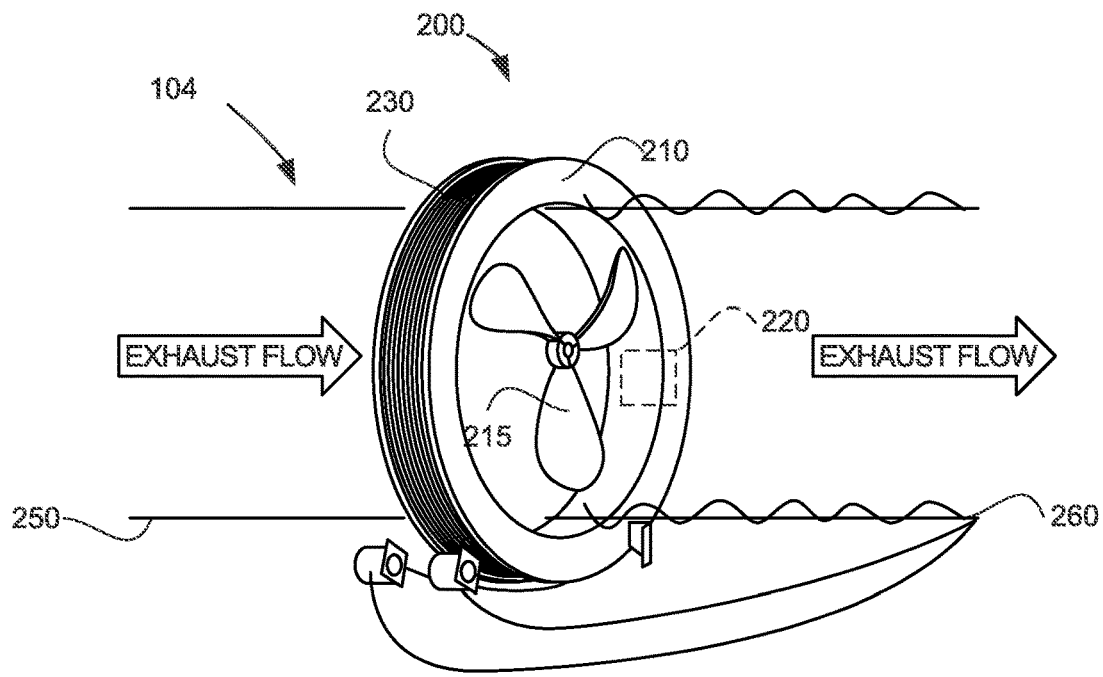
FIG. 2 is an illustration of an energy reutilization system, according to an embodiment.

Referring now to FIG. 2, a schematic diagram of an energy reutilization system 200 is shown, according to an example embodiment. The energy reutilization system 200 is a part of the exhaust aftertreatment system 10 of FIG. 1. Accordingly, the energy reutilization system 200 may include a turbine 210, an impeller 215 (e.g., a turbine wheel), a magnet 220, a coil 230 (e.g., an electromagnetic coil), and a decomposition reactor 104. The energy reutilization system 200 includes a turbine 210 in fluid communication with the decomposition reactor 104.

The turbine 210 includes an impeller 215 (e.g. a turbine wheel) structured to receive exhaust gas driven or otherwise guided by the turbine 210 into the impeller 215. The exhaust energy output from the exhaust gas actuates or otherwise turns the impeller 215 causing the impeller 215 to rotate.

The turbine 210 further includes a magnet 220. The magnet 220 is disposed internal to the turbine 210. In some embodiments, the magnet 220 is coupled to a shaft (not shown) of the turbine 210 such that the magnet 220 is structured for rotatable operation. For example, the magnet 220 may be wound across the turbine shaft such that the magnet 220 rotates about the shaft of the turbine 210. In some embodiments, the magnet 220 may be disposed external, adjacent, or near the turbine 210. The magnet 220 may comprise or otherwise take the form of a disc magnet, cylindrical magnet, other material comprising magnetic and/or ferromagnetic properties, etc. The magnetic power associated with the magnet 220 may be determined according to an example process as follows:

$$V(\text{emf induced}) = N \times A_{(coil)} \times B \times \omega \quad (1),$$

$$\omega = 2 \times \text{pi} \times (\text{RPM of turbine}/60) \quad (2),$$

where the parameters "V (emf induced)" refers to the maximum voltage induce (V), "N" refers to the number of turns, "$A_{(coil)}$" refers to the area (m$^2$) of the coil, "pi" or "$\pi$" refers to a constant (e.g., equal to 3.14159) that represents the ratio of the circumference of a circle to the diameter of the circle, and "$\omega$" refers to the rotational speed (e.g., the angular velocity) in radians per second (rad/s). Accordingly, in an example embodiment, for a maximum voltage V (emf induced)=120 V, N=894 turns, $A_{(coil)}$=0.0855 m$^2$, $\omega$=8377 rad/s, the magnetic power B measured in teslas (T) associated with the magnet 220 results in B=0.2 mT.

The magnet 220 may be electrically or communicatively coupled to the coil 230 (e.g., a copper wire or other electromagnetic conductor that takes the form of a coil, spiral, etc.). The coil 230 is structured to pass current through, for example, a wire to generate a magnetic field as described herein below. In some embodiments, the coil 230 is disposed proximate to (e.g., external to the decomposition reactor) or otherwise coupled to at least a portion of the decomposition reactor 104. The portion of the decomposition reactor 104 includes a surface 250, such as, but not limited to, an exhaust pipe wall, decomposition reactor wall, other area or portion of the decomposition reactor 104 or exhaust aftertreatment system 10. In such example embodiments, the coil 230 may be disposed along the surface (e.g., the surface 250) of the decomposition reactor 104 such that heating will take place at the surface of the decomposition reactor 104 and/or the exhaust pipe. Alternatively or additionally, the portion may include any other area internal to the decomposition reactor 104 or exhaust aftertreatment system 10. The properties associated with the coil 230 may be determined according to an example process as follows:

$$R = \text{\textbf{P}} L/A, V = IR \quad (3),$$

$$P = V \times I = I^2 R \quad (4),$$

$$C = \text{pi} \times D \quad (5),$$

where the parameters "L" refers to the length of the conductor (e.g., the coil) in meters (m), "R" refers to resistance of the conductor in ohms (Ω), "N" refers to the number of turns of the wire, "A" refers to the area (m²) of the coil, $\text{\textbf{P}}$ refers to the electrical resistivity in ohm-metre (Ω·m), "P" refers to the power in watts, "I" refers to the current in amps (A), "V" refers to the voltage (V), "C" refers to the circumference (m), "D" refers to the exhaust pipe diameter.

Accordingly, the length L of the conductor may be minimized by maximizing the current (I) and minimizing the voltage (V) and the diameter (d) of the conductor. In an example embodiment, for a minimum voltage V=120V and maximum current I=250 A, the power generation results in a power generation of up to 30 kW. In a high horse power application, the length L of the conductor (e.g., a copper wire) structured to pass the current is 893 m, where $\text{\textbf{P}} = 1.7*(10^\wedge-8)$ ohm-m, d=0.25 to 0.3 inches or 0.00635 m to 0.00762 m, D=13 inches or 0.3302 m, C=1.03 m, N=894 turns, and R=0.48 ohms.

The decomposition reactor 104 is electrically or communicatively coupled to the controller 120. The controller 120 is configured to cause the energy reutilization system 200 to heat a portion 250 of the decomposition reactor 104. In some embodiments, the controller 120 is configured to cause the energy reutilization system 200 to heat a portion of the decomposition reactor, particulate filter, reductant delivery system, selective catalytic reduction system, diesel oxidation catalyst, or a combination thereof. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), Erasable Programmable Read Only Memory (EPROM), flash memory, or any other suitable memory from which the controller 120 can read programmatic instructions.

In some embodiments, the controller 100 is structured to determine exhaust energy output of a turbine associated with an exhaust system. The determined exhaust energy output may be used by the controller 100 to control one more components in the energy reutilization system 200 and/or for energy reutilization purposes. To that end, the controller 100 may be structured, in some embodiments, to cause generation of a magnetic field to cause at least a portion of the decomposition reactor 104 to heat as described herein with reference to FIG. 3.

Figure 3:
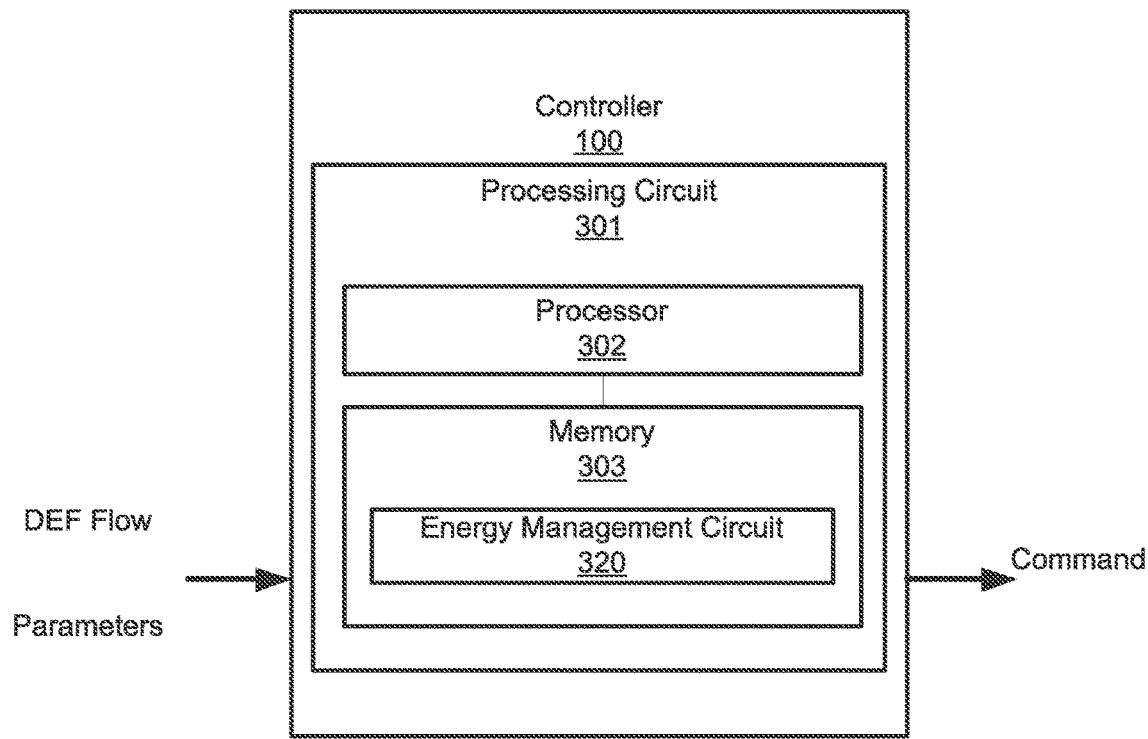
FIG. 3 is a schematic diagram of an example controller that may be used with the systems of FIG. 1 and FIG. 2.

With the above description in mind, referring now to FIG. 3, an example structure for the controller 100 is shown according to one embodiment. As shown, the controller 100 includes a processing circuit 301 including a processor 302 and a memory 303. The processor 302 may be implemented as a general-purpose processor, an ASIC, one or more field programmable gate arrays (FPGAs), a digital signal processor (DSP), a group of processing components, or other suitable electronic processing components. The one or more memory devices 303 (e.g., RAM, ROM, Flash Memory, hard disk storage, etc.) may store data and/or computer code for facilitating the various processes described herein. Thus, the one or more memory devices 303 may be communicably connected to the processor 302 and provide computer code or instructions to the processor 302 for executing the processes described in regard to the controller 100 herein. Moreover, the one or more memory devices 303 may be or include tangible, non-transient volatile memory or non-volatile memory. Accordingly, the one or more memory devices 303 may include database components, object code components, script components, or any other type of information structure for supporting the various activities and information structures described herein.

The memory 303 may include various circuits for completing at least some of the activities described herein. More particularly, the memory 303 includes the energy management circuit 320 which is structured to facilitate the reutilization of exhaust energy. While the memory 303 is shown to include the energy management circuit 320 FIG. 3, it should be understood that the controller 100 and memory 303 may include any number of circuits for completing the functions described herein. For example, the activities of multiple circuits may be combined as a single circuit, additional circuits with additional functionality may be included, etc. Further, it should be understood that the controller 100 may control other activity beyond the scope of the present disclosure, such as the control of other vehicle systems. In this regard, the controller 100 may be embodied as an electronic control unit (ECU) included with a vehicle or included with an existing ECU, such as a transmission control unit and any other vehicle control unit (e.g., exhaust aftertreatment control unit, powertrain control circuit, engine control circuit, etc.). All such structural configurations of the controller 100 are intended to fall within the spirit and scope of the present disclosure.

The energy management circuit 320 is structured to determine exhaust energy output of a turbine (e.g., the turbine 210) associated with the exhaust aftertreatment system 10 (e.g., associated with the decomposition reactor 104 of the exhaust aftertreatment system 10). An example process that may be utilized by energy management circuit 320 to determine the exhaust energy output is as follows:

$$\text{Turbine Output} = \text{mass flow rate} \times Cp \times (T1 - T2)_{actual}, \quad (6)$$

$$(T1 - T2)_{actual} = \text{isentropic efficiency} \times (T1 - T2)_{ideal}, \quad (7)$$

$$(T1 - T2)\text{actual} = \text{isentropic efficiency} \times \left(T1 - T1 \times \frac{P2^{(\gamma-1)/\gamma}}{P1}\right), \quad (8)$$

-continued $$(T1-T2)\text{actual} = \text{isentropic efficiency} \times T1\left(1 - \frac{P2^{(\gamma-1)/\gamma}}{P1}\right), \quad (9)$$

Figure 4:
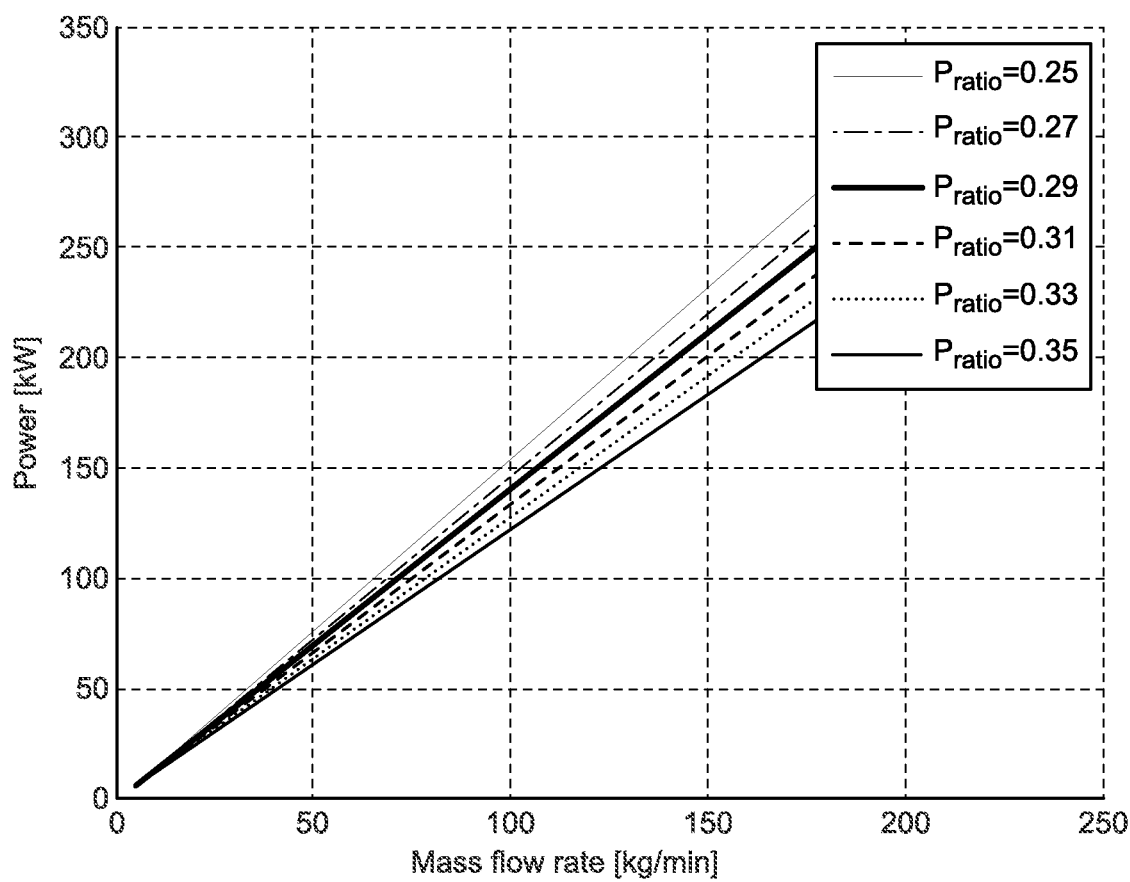
FIG. 4 is a plot of power vs mass flow rate showing various amounts of power that may be extracted at various mass flow rates.

The parameter "Cp" refers to the polytropic coefficient, "T" refers to the exhaust stream temperature in Kelven (K), "γ" refers to the polytropic index, and "P" refers to the pressure of the exhaust gases. The mass flow of exhaust gases ranges from 0 kg/min to 215 kg/min. For the turbine 210, in an example embodiment where the parameters such as the isentropic efficiency (e.g., the degree of degradation of exhaust energy) is 65%, the expansion ratio=1:3.5=0.25 to 0.35, the exhaust stream temperature of 450K, polytropic coefficient=1.35, the exhaust energy output (e.g., the power output) may be expressed according to FIG. 4 which illustrates a plot of power on the Y-axis and mass flow rate on the X-axis showing various amounts of power that may be extracted at various mass flow rates, according to an example embodiment. As shown in FIG. 4, at an exhaust mass flow rate of 50 kg/min, 50 kW of heat energy may be utilized or otherwise extracted. The exhaust energy output and the associated parameters described above may be stored in memory (e.g., memory 303) by the energy management circuit 320. The energy management circuit 320 may utilize the processor 302 to perform the actions described herein.

As described herein above, the exhaust energy output from the exhaust gas actuates or otherwise turns the impeller 215 such that the energy management circuit 320 may determine the exhaust energy output. In one embodiment, the energy management circuit 320 may include or be communicably coupled to one or more sensors for receiving values indicative of the parameters associated with the exhaust energy output described herein or otherwise determining the exhaust energy output. For example, the energy management circuit 320 receive, via one or more sensors and/or the memory 303, values indicative of the parameters (e.g., the mass flow rate, polytropic coefficient, temperature, etc.) associated with the exhaust energy output determine the exhaust energy output according to the algorithm, Turbine Output=mass flow rate×Cp×(T1−T2)actual. In another embodiment, the energy management circuit 320 may include communication circuitry including, but not limited to, wired and wireless communication protocol to facilitate reception of a value indicative of the exhaust energy output. In still another embodiment, the energy management circuit 320 may include machine-readable media stored by the memory and executable by the processor, wherein the machine-readable media facilitates performance of certain operations to receive a value of the parameters associated with the exhaust energy output. For example, the machine-readable media may provide an instruction (e.g., command, etc.) to a sensor operatively coupled to the turbine 210, the energy reutilization system 200, the exhaust aftertreatment system 10, etc. to monitor and acquire data indicative of the exhaust energy output. In this regard, the machine-readable media may include programmable logic that defines the frequency of acquisition of the exhaust energy output data.

The energy management circuit 320 is further structured to cause generation of a magnetic field based on the exhaust energy output. The exhaust energy output may correspond to an electrical load such that the exhaust energy output is consumed, via the circuitry described herein, resulting in the electrical load. If the electrical load is greater than a predetermined threshold, the energy management circuit 320 may generate a command structured to engage the turbine 210. As the magnet 220 rotates at the RPM of the turbine 210, the magnet 220 generates a current in the coil 230. In turn, a magnetic field is generated responsive to generation of the current. In some embodiments, the energy management circuit 320 may be tripped when the exhaust energy output generated is equal to a calibrateable amount of exhaust energy output. For example, the energy management circuit 320 is tripped when the exhaust energy output generated equals a calibrateable amount exhaust energy output required to minimize DEF deposits in the decomposition reactor 104. If the energy management circuit 320 is tripped, the turbine 210 and the magnet 220 may remain engaged resulting in a continuous flow of current in the coil 230.

As described herein, the coil 230 (e.g., a conductor) is structured to pass current (e.g., pass current by a conductor such as a wire) to generate a magnetic field. As the current passes through the conductor, a magnetic field is generated or otherwise created around the coil (e.g., around the conductor). An electron, proton, ion, or other charged particle is in motion cause magnetic lines of force to rotate around the particle. The electrical current passing through the coil 230 includes electrons in motion which cause magnetic lines of force to rotate around the electron resulting in the magnetic field around the coil 230. The magnetic field strength may be based on the shape of the coil 230 in that the shape of the coil 230 (e.g., the separate turns of wire passing through the coil 230) increases the strength of magnetic field. The magnetic field strength may express a direct relationship with the shape of the coil 230 such that the greater the number of turns of the wire or conductor, the stronger the magnetic field generated. The current generated or otherwise created in the coil 230 disposed proximate to a portion (e.g., the surface 250) of the decomposition reactor 104 generates the magnetic field. The magnetic field causes at least a portion of the decomposition reactor to heat. In some embodiments, the magnetic field causes at least a portion of the decomposition reactor, particulate filter, reductant delivery system, selective catalytic reduction system, diesel oxidation catalyst, or a combination thereof to heat.

In some embodiments, the current generated in the coil 230 may generate electricity such that one or more heating elements 260 may be powered by the electricity generated to heat the portion (e.g., the surface 250) of the decomposition reactor 104. The heating element may comprise, but is not limited to, any suitable nickel, iron, ceramic, polymer, composite, or combination thereof heating element. Advantageously, heating the surface of the decomposition reactor 104 reutilizes the exhaust energy to avoid formation of cold spots during DEF injection and to minimize DEF deposits.

Figure 5:
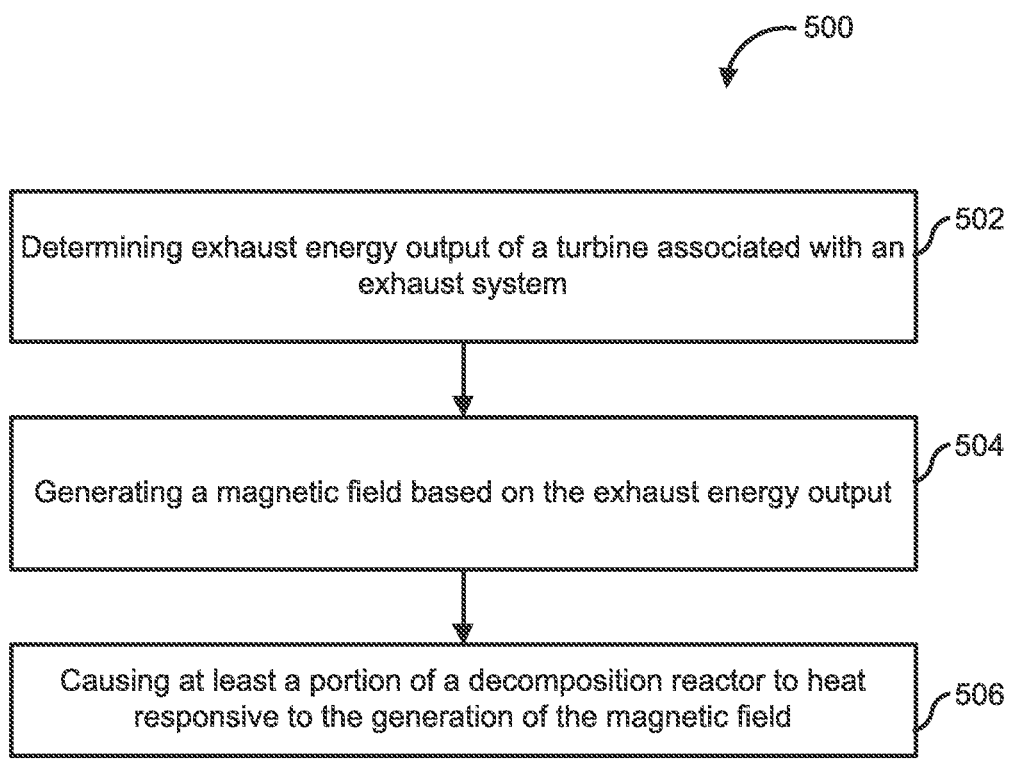
FIG. 5 is a schematic diagram of a flowchart of a method for reutilizing exhaust energy, according to an example embodiment.

Referring now to FIG. 5, a flowchart of a method for reutilizing exhaust energy is shown, according to one embodiment via the circuitry described herein with reference to FIGS. 1-2. At process 502, the exhaust energy output of a turbine associated with an exhaust system is determined. In one embodiment, the controller may include or be communicably coupled to one or more sensors for receiving values indicative of the parameters associated with the exhaust energy output. The exhaust energy output may be determined based on the processes described herein and/or the values received.

At process 504, the magnetic field is generated based on the exhaust energy output. The exhaust energy output may correspond to an electrical load such that the exhaust energy output is consumed resulting in the electrical load. The controller may generate a command structured to engage various components of the exhaust system such as, for example, the magnet, impeller, and/or the turbine. As the magnet rotates according to the RPM of the turbine, the magnet generates a current in the coil which generates the magnetic field.

The magnetic field generated causes at least a portion of the decomposition reactor to heat at 506. As the current passes through the coil coupled to the decomposition reactor, a magnetic field is generated or otherwise created around the coil (e.g., around the conductor). The magnetic field causes the portion (e.g., surface) of the decomposition reactor to heat. Alternatively or additionally, the current generated in the coil may generate electricity such that one or more heating elements may be powered to heat the surface of the decomposition reactor. Heating various portions of the decomposition reactor provides the benefits of avoiding the formation of cold spots during DEF injection and minimizing DEF deposits.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as circuits, in order to more particularly emphasize their implementation independence. For example, a circuit may be implemented as a hardware circuit comprising custom VLSI circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

Circuits may also be implemented in machine-readable medium for execution by various types of processors. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit.

Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network. Where a circuit or portions of a circuit are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a computer or entirely on the computer or server. In the latter scenario, the computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As used herein, the term "proximate" may be used to refer to the position of a component or system in relation to one or more other components or systems such that the components may contact each other or may be near each other.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A system for reutilizing energy in exhaust gas, the system comprising:
    a decomposition reactor;
    a turbine in fluid communication with the decomposition reactor, the turbine comprising a magnet and being configured to spin when exhaust gas flows through the decomposition reactor,
    a coil disposed proximate the decomposition reactor, wherein a current is generated in the coil due to rotation of the magnet of the turbine; and
    a heating element configured to generate heat using the current generated in the coil.

2. The system of claim 1, wherein the magnet is coupled to a shaft of the turbine.

3. The system of claim 1, wherein the coil is coupled to the decomposition reactor.

4. The system of claim 1, wherein a length of the coil is determined according to an equation, $L=RA/P$, and wherein L corresponds to the length of the coil, R corresponds to resistance, A corresponds to area of the coil, and $P$ corresponds to electrical resistivity.

* * * * *